(12) United States Patent
Le et al.

(10) Patent No.: US 12,287,481 B2
(45) Date of Patent: Apr. 29, 2025

(54) OPTICAL SYSTEM

(71) Applicant: 3M INNOVATIVE PROPERTIES COMPANY, St. Paul, MN (US)

(72) Inventors: John D. Le, Woodbury, MN (US); Timothy L Wong, West St. Paul, MN (US); Timothy J. Nevitt, Red Wing, MN (US); Zhisheng Yun, Sammamish, WA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 531 days.

(21) Appl. No.: 17/639,953

(22) PCT Filed: Sep. 9, 2020

(86) PCT No.: PCT/IB2020/058391
§ 371 (c)(1),
(2) Date: Mar. 3, 2022

(87) PCT Pub. No.: WO2021/048767
PCT Pub. Date: Mar. 18, 2021

(65) Prior Publication Data
US 2022/0326523 A1   Oct. 13, 2022

Related U.S. Application Data

(60) Provisional application No. 62/899,801, filed on Sep. 13, 2019.

(51) Int. Cl.
*G02B 5/30* (2006.01)
*G02B 27/01* (2006.01)

(52) U.S. Cl.
CPC ....... *G02B 27/0172* (2013.01); *G02B 5/3025* (2013.01); *G02B 5/3083* (2013.01);
(Continued)

(58) Field of Classification Search
CPC .. G02B 27/0172; G02B 5/3025; G02B 5/305; G02B 5/3083; G02B 2027/0112; G02B 2027/0118; G02B 27/08
(Continued)

(56) References Cited

U.S. PATENT DOCUMENTS 5,383,053 A * 1/1995 Hegg ................. G02B 27/0101
359/485.05
5,882,774 A    3/1999 Jonza
(Continued)

FOREIGN PATENT DOCUMENTS

| CN | 108897136 | 11/2018 |
| JP | 06059217 | 3/1994 |
| WO | WO 2018-013784 | 1/2018 |

OTHER PUBLICATIONS

International Search Report for PCT International Application No. PCT/IB2020/058391, mailed on Dec. 8, 2020, 3 pages.

*Primary Examiner* — Ricky D Shafer
(74) *Attorney, Agent, or Firm* — Clifton F. Richardson; Robert S. Moshrefzadeh

(57) ABSTRACT

An optical system for displaying first and second images to a viewer is provided. A reflective polarizer is disposed between the second display and the viewer and is oriented obliquely relative to the first display. An optical stack including a partial reflector and a retarder layer is disposed between the reflective polarizer and the second display. The reflective polarizer reflects at least 70% of the incident light having a first polarization state and transmits at least 60% of the incident light having an orthogonal second polarization state. The partial reflector reflects at least 70% of the incident light for each of the polarization states. For each of the first and second polarization states and for each of a blue-green wavelength and a green-red wavelength the reflective polarizer transmits at east 70% of the incident light
(Continued)

and the partial reflector transmits at least 60% of the incident light.

14 Claims, 4 Drawing Sheets

(52) U.S. Cl.
CPC ............... *G02B 2027/0112* (2013.01); *G02B 2027/0118* (2013.01)

(58) Field of Classification Search
USPC ........................... 359/485.1, 485.03, 489.07
See application file for complete search history.

(56) References Cited

U.S. PATENT DOCUMENTS

| | | | |
|---|---|---|---|
| 5,903,396 A * | 5/1999 | Rallison | G02B 27/0101 359/13 |
| 6,179,948 B1 | 1/2001 | Merrill | |
| 6,665,119 B1 * | 12/2003 | Kurtz | H01Q 15/24 359/485.05 |
| 6,783,349 B2 | 8/2004 | Neavin | |
| 9,557,568 B1 * | 1/2017 | Ouderkirk | G02B 27/286 |
| 11,372,239 B1 * | 6/2022 | Sulai | G02B 17/004 |
| 2020/0319389 A1 * | 10/2020 | Yun | G02B 5/305 |
| 2021/0173216 A1 | 6/2021 | Xiao | |

* cited by examiner

OPTICAL SYSTEM

CROSS REFERENCE TO RELATED APPLICATIONS

This application is a national stage filing under 35 U.S.C. 371 of PCT/IB2020/058391 filed Sep. 9, 2020, which claims the benefit of Provisional Application No. 62/899,801, filed Sep. 13, 2019, the disclosure of which is incorporated by reference in its/their entirety herein.

TECHNICAL FIELD

The disclosure generally relates to optical systems, particularly to optical systems for displaying first and second images to a viewer.

BACKGROUND

Augmented reality (AR) technology greatly enhances user's perception of, and interaction with, the real physical world by superimposing virtual computer-generated image into the real physical world. Head-mounted display (HMD) is one of the most widely used embodiments for AR technology. An AR HMD is a device worn on the head or part of a helmet and enables the user to see both a virtual image and an image of the real world. An optical see-through system employs a half mirror or a beam splitter to allow the direct view of the real physical world together with the computer-generated image. Thus, the real world may be observed more naturally without any resolution reduction. Optical see-through-type HMDs have been commonly used in AR HMD products.

SUMMARY

In some aspects of the disclosure, an optical system for displaying first and second images to a viewer is provided. The optical system includes different first and second displays. A reflective polarizer is disposed between the second display and the viewer and oriented obliquely relative to the first display. The reflective polarizer includes substantially distinct blue, green and red reflection bands. An optical stack is disposed between the reflective polarizer and the second display. The optical stack includes a partial reflector disposed between the reflective polarizer and the second display. The optical stack also includes a retarder layer disposed between the reflective polarizer and the partial reflector. For substantially normally incident light and for each of a blue wavelength, a green wavelength, and a red wavelength in a predetermined wavelength range extending from about 400 nm to about 700 nm, the reflective polarizer reflects at least 70% of the incident light having a first polarization state and transmits at least 60% of the incident light having an orthogonal second polarization state. For substantially normally incident light and for each of a blue wavelength, a green wavelength, and a red wavelength in a predetermined wavelength range extending from about 400 nm to about 700 nm, the partial reflector reflects at least 70% of the incident light for each of the first and second polarization states. The retarder layer is substantially a quarter wave retarder at at least one of the blue, green and red wavelengths for at least one of the first and second polarization states. For each of the first and second polarization states and for each of a blue-green wavelength between the blue and green wavelengths and a green-red wavelength between the green and red wavelengths, the reflective polarizer transmits at least 70% of the incident light. For each of the first and second polarization states and for each of a blue-green wavelength between the blue and green wavelengths and a green-red wavelength between the green and red wavelengths, the partial reflector transmits at least 60% of the incident light.

BRIEF DESCRIPTION OF DRAWINGS

The various aspects of the disclosure will be discussed in greater detail with reference to the accompanying figures where.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Near-eye Display (NED) devices, such as a head mounted display devices, may be worn by a viewer for experiences such as an augmented reality experience and a virtual reality experience. A birdbath NED device is a device in which a beam splitter is used with an on-axis reflector to focus an image from an image producing device. The optical system should display the image to the viewer with increased brightness when the image is integrated with the view of the real physical world. Embodiments described herein address these and other challenges.

Figure 1:
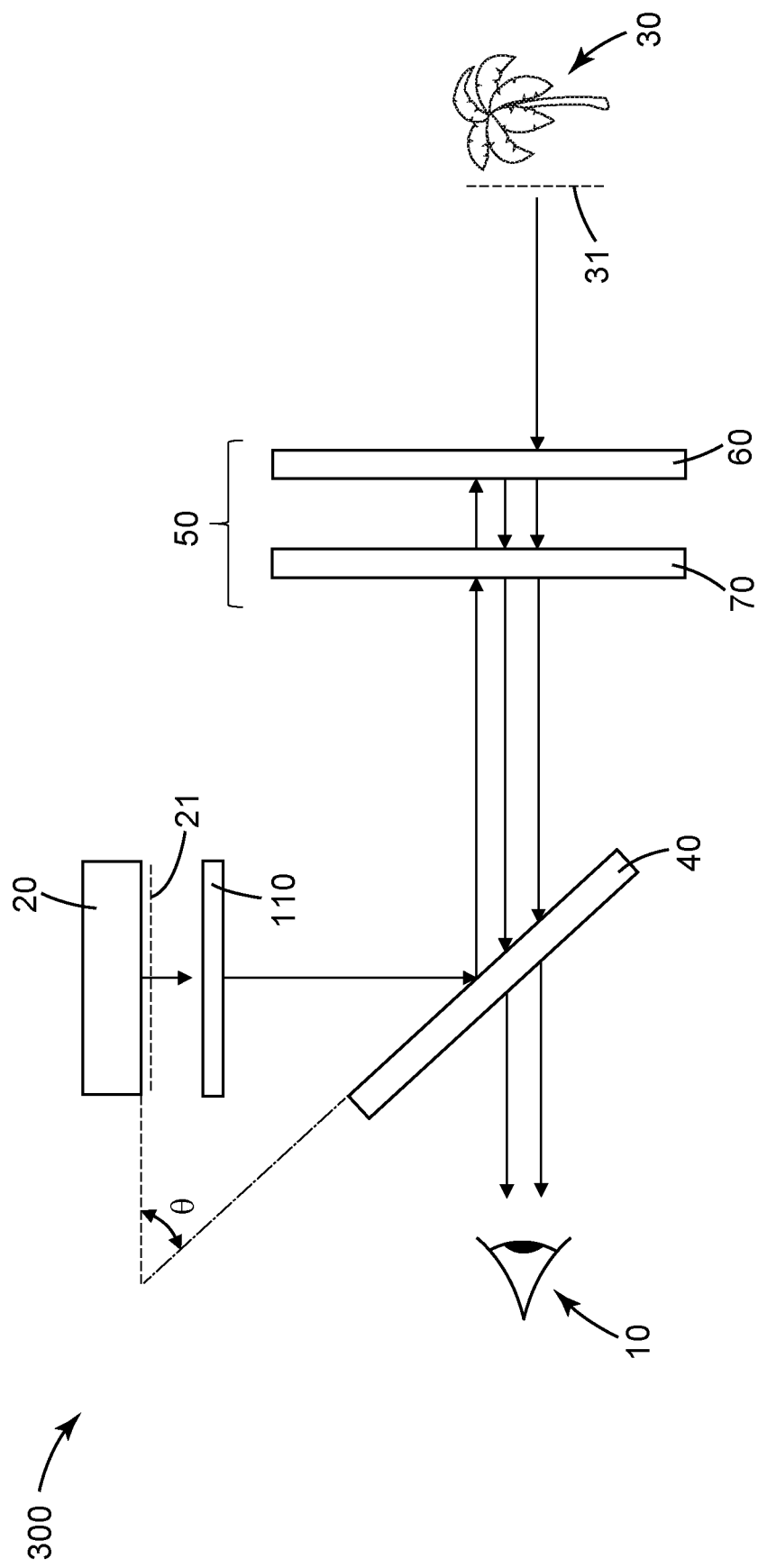
FIGS. 1 and 2 are schematic diagrams showing the optical system according to some aspects of the disclosure.
Figure 2:
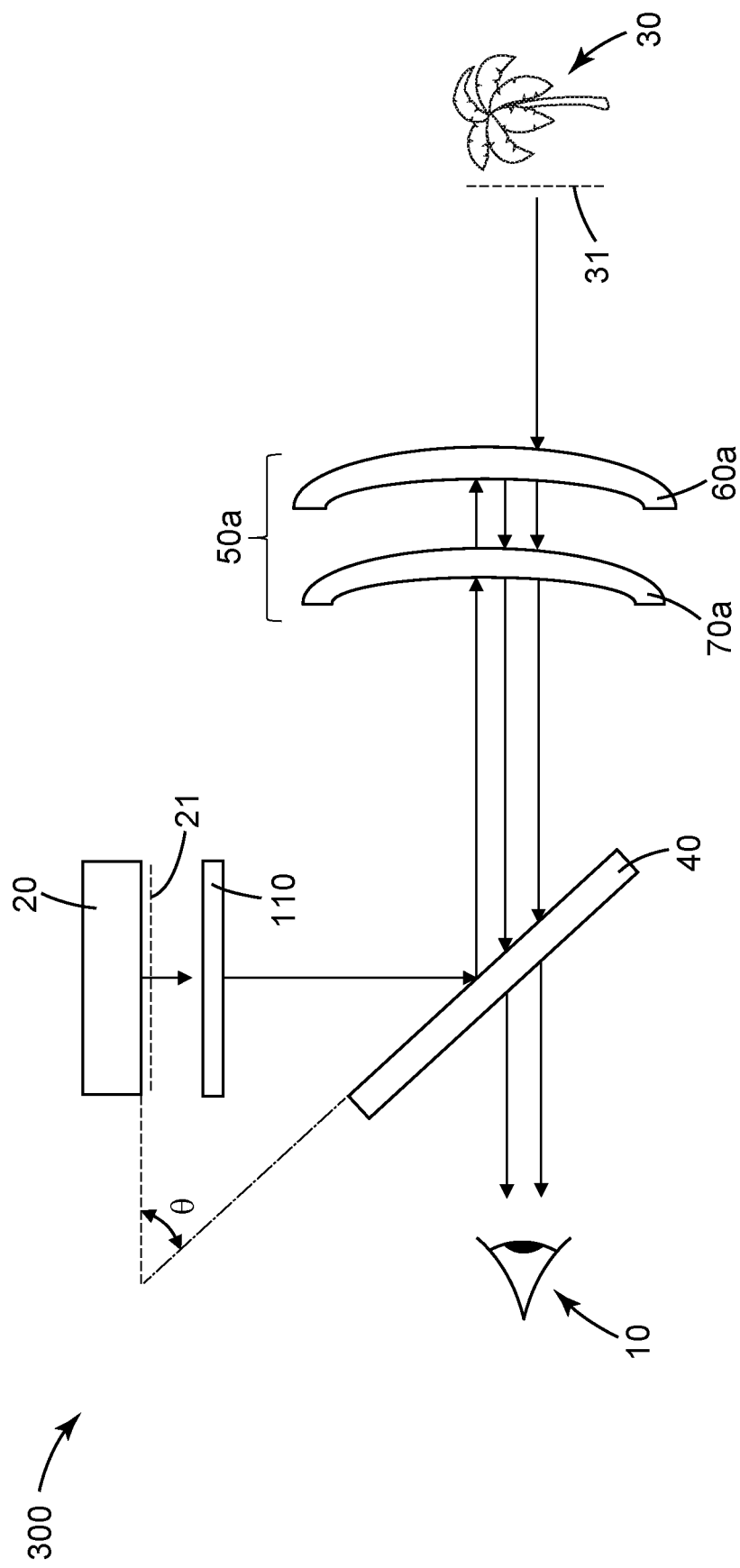

According to some embodiments as illustrated in FIGS. 1 and 2, an optical system (300) is provided for displaying first (21) and second (31) images to a viewer (10). In some embodiments, optical system (300) may be incorporated into a wearable display device or a head mounted display (HMD). The optical system includes a first display (20) that produces the first image (21) and a different second display (30) that produces the second image (31). The first display (20) may include any suitable type of image producing display, and may be a polarized or non-polarized display device. For example, the first display may be an electronic display, such as, for instance, one or more of a liquid crystal display (LCD), and an organic light emitting diode (OLED) display. In other instances, the first display (20) may include an emissive microdisplay, such as an OLED (Organic Light Emitting Device) display, and/or a reflective microdisplay, such as an LCoS (Liquid Crystal on Silicon) display or digital light processing (DLP) device. The first display (20) may have any suitable location relative to other optical components. For instance, in some examples, the first display (20) may be disposed at a top side of the optical system from a perspective of the viewer (10). The second display (30) may be a real-world object in a real-world scene. A real-world scene may be light or images available to a viewer without electronically aided vision.

Figure 4:
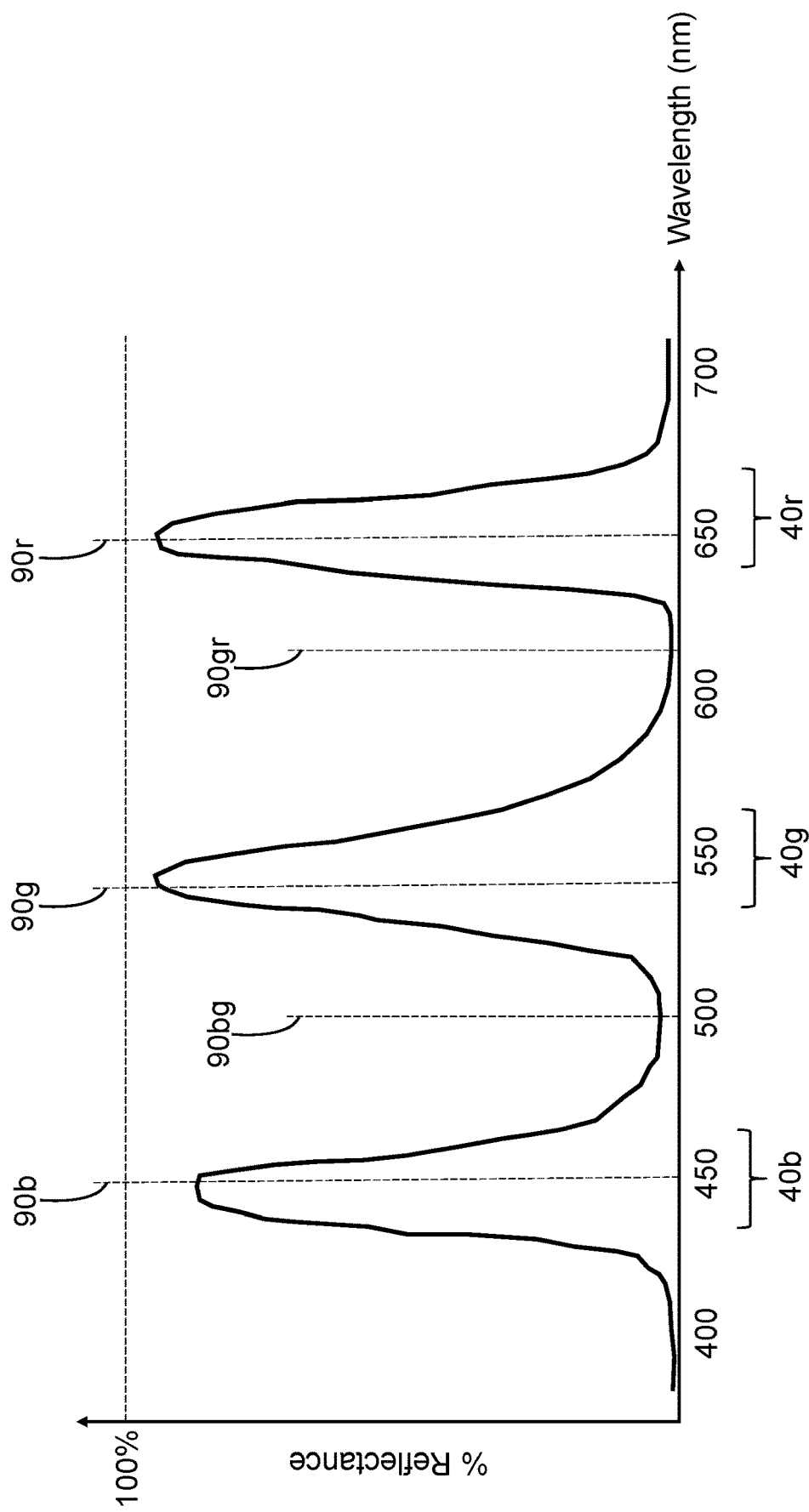
FIG. 4 is a graphical view showing red, green and blue reflection bands according to some aspects of the disclosure.

In some embodiments, a reflective polarizer (40) may be disposed between the second display (30) and the viewer (10). The reflective polarizer (40) may be oriented obliquely relative to the first display (20). In some instances, the reflective polarizer makes an angle (θ) between about 30 degrees to about 60 degrees with the first display (20), or may be 40 degrees to about 60 degrees with the first display (20). In some aspects, the reflective polarizer may make an angle (θ) of 45 degrees with the first display (20). The reflective polarizer (40) includes substantially distinct blue (40b), green (40g) and red (40r) reflection bands as illustrated in FIG. 4.

Reflecting polarizers generally include materials which transmit light of a first polarization and which reflect light of a second, different polarization. Reflecting polarizers include, by way of example and not of limitation, diffusely reflecting polarizers, multilayer reflective polarizers, and cholesteric reflective polarizers. The reflective polarizer (40) may be a wide-band reflective polarizer or a notch reflective polarizer. In other instances, the reflective polarizer (40) may be one or more of an absorbing linear polarizer, a multilayer polymeric reflective polarizer, a wire grid reflective polarizer, or a laminate of a reflective polarizer, which substantially transmits light having a first polarization state and substantially reflects light having an orthogonal second polarization state, causing the light emitted by the display (20) to be polarized. Substantially uniaxially oriented reflective polarizers are available from 3M Company under the trade designation Advanced Polarizing Film 5 or APF. Other types of multilayer optical film reflective polarizers (e.g., Dual Brightness Enhancement Film or DBEF available from 3M Company) may also be used. In some embodiments, other types of reflective polarizers (e.g., wire-grid polarizers) are used.

The optical system (300) includes an optical stack (50) disposed between the reflective polarizer (40) and the second display (30). The optical stack includes at least a partial reflector (60) and a retarder layer (70). In some embodiments, the partial reflector (60) may be disposed between the reflective polarizer (40) and the second display (30) and the retarder layer (70) may be disposed between the reflective polarizer (40) and the partial reflector (60). In some aspects, the optical stack may be a curved optical stack (50a) as shown in FIG. 2. In some cases, at least one of the partial reflector (60a) and the retarder layer (70a) may be curved.

In certain aspects, the partial reflector (60, 60a) may be a notch reflector. For example, the partial reflector (60, 60a) may have reflection bands (e.g., for each of the first and second polarization states) as schematically illustrated in FIG. 4. In other aspects, the partial reflector (60, 60a) may be a 50/50 beam splitter obtained by coating metals, for instance, aluminum or silver, onto plastic or glass plates. In some other aspects, the partial reflector (60) may include a plurality of polymeric layers numbering greater than about 50, or greater than 100, or greater than 150 in total. The polymeric layers may be sufficiently thin so that light reflected at a plurality of interfaces undergoes constructive or destructive interference to give the partial reflector the desired reflective or transmissive properties. Reflective films (e.g., partial reflectors or reflective polarizers) including a plurality of polymeric layers are described, for example, in U.S. Pat. No. 5,882,774 (Jonza et al.), U.S. Pat. No. 6,179,948 (Merrill et al.), and U.S. Pat. No. 6,783,349 (Neavin et al.), each of which is incorporated herein by reference to the extent that it does not contradict the present description. In some embodiments, the polymeric layers include one or more of a polycarbonate, a polymethyl methacrylate (PMMA), a polyethylene terephthalate (PET), a glycol-modified polyethylene terephthalate (PETG), a polyethylene naphthalate (PEN), and a PEN/PET copolymer. A lesser number of layer pairs over a wavelength range may increase transmission at lower wavelength at corresponding incidence angles for a narrow bandwidth source. According to an aspect of the disclosure, the partial reflector (60, 60a) transmits the second image (31) produced by the second display (30).

In certain embodiments, the retarder layer (70) may be a film laminated on the reflective polarizer (40) or may be a coating applied to the reflective polarizer (40). For example, the retarder layer (70) may be an oriented polymer film laminated to the reflective polarizer (40), or a liquid crystal polymer coating on the reflective polarizer (40). In some other embodiments, the retarder layer (70) may be a quarter wave retarder layer at at least one wavelength in the at least one desired wavelength. In some embodiments, the at least one desired wavelength may be a desired plurality of wavelengths and the retarder layer (70) may be a quarter wave retarder at at least one wavelength in the desired plurality of wavelengths. In some aspects, the retarder layer (70) may be a quarter wave retarder layer at at least one of the blue, green and red wavelengths for at least one of the first and second polarization states. Suitable coatings for forming a quarter wave retarder include, but not restricted to, linear photopolymerizable polymer (LPP) materials and liquid crystal polymer (LCP) materials, as described elsewhere.

Figure 5:
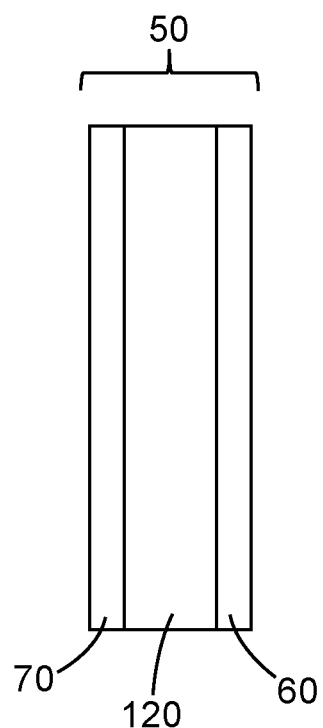
FIG. 5 schematically shows an optical stack according to some aspects of the disclosure.

In some aspects, the optical stack (50) including the partial reflector (60) and the retarder layer (70) may be prepared, for instance, by coating a quarter wave retarder onto a partial reflector film, or by coating a partial reflector coating onto a quarter wave retarder film, or by laminating a partial reflector film and a quarter wave retarder film together. In some other aspects, the optical stack (50) includes an adhesive layer (120) for bonding the partial reflector (60) to the retarder layer (70) as schematically illustrated in FIG. 5.

Figure 3:
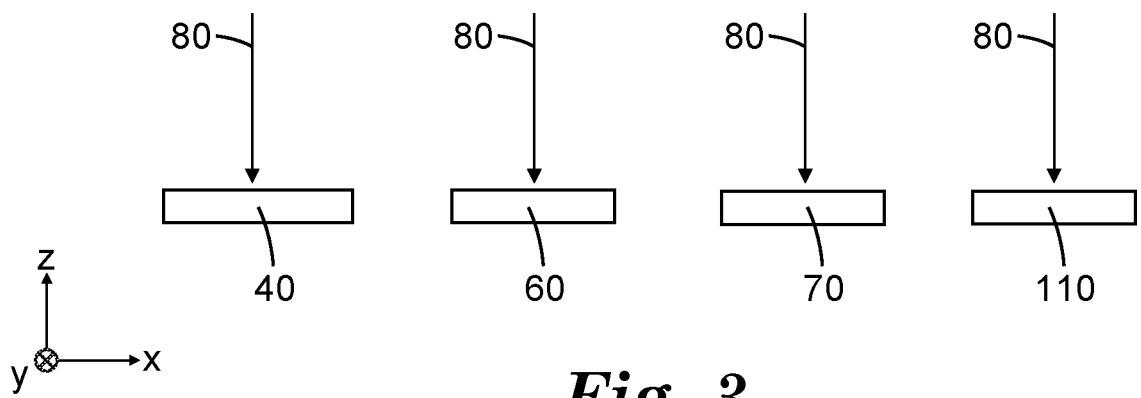
FIG. 3 schematically illustrates normally incident light on the optical system according to some aspects.

In some embodiments, for substantially normally incident light (80), as shown in FIG. 3, and for each of a blue wavelength (90b), a green wavelength (90g), and a red wavelength (90r) in a predetermined wavelength range (FIG. 4), the reflective polarizer (40) may be said to substantially reflect light having a first polarization state (x-axis) if at least 70% of incident light having the first polarization state is reflected from the polarizer (40). In some embodiments, at least 80%, or at least 90% of incident light having the first polarization state is reflected from the polarizer (40). In some embodiments, for substantially normally incident light, and for each of a blue wavelength (90b), a green wavelength (90g), and a red wavelength (90r) in a predetermined wavelength range, the reflective polarizer (40) may be said to substantially transmit light having an orthogonal second polarization state (y-axis) if at least 60% of incident light having the orthogonal second polarization state is transmitted from the reflective polarizer (40). In some embodiments, at least 70%, or at least 80%, of incident light having the orthogonal second polarization state is transmitted from the polarizer (40). The predetermined wavelength range may be a visible wavelength range extending from about 400 nm to about 700 nm, in some aspects. For instance, the blue wavelength (90b) may be in a range from about 425 nm to about 475 nm, the green wavelength (90g) may be in a range from about 525 nm to about 575 nm, and the red wavelength (90r) may be in a range from about 625 nm to about 700 nm.

In some embodiments, for substantially normally incident light (80), and for each of a blue wavelength (90b), a green wavelength (90g), and a red wavelength (90r) in a predetermined wavelength range, the partial reflector (60) reflects at least 70% of the incident light for each of the first (x-axis) and second (y-axis) polarization states. In some aspects, for substantially normally incident light, and for each of a blue wavelength (90b), a green wavelength (90g), and a red wavelength (90r) in a predetermined wavelength range, the partial reflector (60) reflects at least 80% of the incident light for each of the first and second polarization states. The predetermined wavelength range may be a visible wavelength range extending from about 400 nm to about 700 nm, in some aspects. For instance, the blue wavelength (90b) may be in a range from about 425 nm to about 475 nm, the green wavelength (90g) may be in a range from about 525 nm to about 575 nm, and the red wavelength (90r) may be in a range from about 625 nm to about 700 nm.

In some aspects, for substantially normal incident light, and for each of the first and second polarization states, and for each of a blue-green wavelength (90bg) between the blue and green wavelengths and a green-red wavelength (90gr) between the green and red wavelengths (FIG. 4), the reflective polarizer (40) may transmit at least 70%, or at least 80% of the incident light. In some other aspects, for substantially normal incident light, and for each of the first and second polarization states, and for each of a blue-green wavelength (90bg) between the blue and green wavelengths and a green-red wavelength (90gr) between the green and red wavelengths, the partial reflector (60) transmits at least 60%, or at least 70% of the incident light. In some cases, the blue-green wavelength (90bg) between the blue and green wavelengths may be less than 550 nm, and the green-red wavelength (90gr) between the green and red wavelengths may be less than 650 nm.

In some other embodiments, the optical system (300) includes an absorbing polarizer (110). The absorbing polarizer (110) may be disposed between the first display (20) and the reflective polarizer (40). The absorbing polarizer (110) substantially transmits light having one of orthogonal first and second polarization states (e.g., a first polarization state with the electric field along the x-axis) and substantially absorbs light having the other of the first and second polarization states (e.g., a second polarization state with the electric field along the y-axis) for each of the blue, green and red wavelengths.

In some embodiments, for a substantially normally incident light (80) and for each of the blue, green and red wavelengths, the absorbing polarizer (110) may be said to substantially transmit light having a first polarization state if at least 60%, or at least 70%, of incident light having the first polarization state is transmitted through the absorbing polarizer (110). In some embodiments, at least 80% of incident light having the first polarization state for each of the blue, green and red wavelengths is transmitted through the absorbing polarizer (110).

In some embodiments, for a substantially normally incident light (80), and for each of the blue, green and red wavelengths, the absorbing polarizer (110) may be said to substantially absorb light having a second polarization state if at least 60%, or at least 70%, of incident light having the second polarization state is absorbed by the absorbing polarizer (110). In some embodiments, at least 80% of incident light having the second polarization state or each of the blue, green and red wavelengths is absorbed by the absorbing polarizer (110).

For instance, the blue wavelength (90b) may be in a range from about 425 nm to about 475 nm, the green wavelength (90g) may be in a range from about 525 nm to about 575 nm, and the red wavelength (90r) may be in a range from about 625 nm to about 700 nm.

In some embodiments, the absorbing polarizer (110) may be an iodine-doped polyvinyl alcohol (PVA) polarizer. Such polarizers include an oriented PVA layer impregnated with iodine. In other embodiments, other types of absorbing polarizers (e.g. oriented polymer polarizers impregnated with an organic dye) are used.

The optical system (300) according to one or more of the embodiments described herein increases the brightness of the image while maintaining high resolution and contrast.

The invention claimed is:
1. An optical system for displaying first and second images to a viewer, comprising:
different first and second displays, the first display configured to produce a polarized image;
a reflective polarizer disposed between the second display and the viewer and oriented obliquely relative to the first display, the reflective polarizer comprising substantially distinct blue, green and red reflection bands;
an absorbing polarizer disposed between the first display and the reflective polarizer; and
an optical stack disposed between the reflective polarizer and the second display and comprising:
a partial reflector disposed between the reflective polarizer and the second display; and
a retarder layer disposed between the reflective polarizer and the partial reflector, such that for substantially normally incident light and for each of a blue wavelength, a green wavelength, and a red wavelength in a predetermined wavelength range extending from about 400 nm to about 700 nm:
the reflective polarizer reflects at least 70% of the incident light having a first polarization state and transmits at least 60% of the incident light having an orthogonal second polarization state; and
the partial reflector reflects at least 70% of the incident light for each of the first and second polarization states;
wherein the retarder layer is substantially a quarter wave retarder at at least one of the blue, green and red wavelengths for at least one of the first and second polarization states; and
for each of the first and second polarization states and for each of a blue-green wavelength between the blue and green wavelengths and a green-red wavelength between the green and red wavelengths:
the reflective polarizer transmits at least 70% of the incident light; and
the partial reflector transmits at least 60% of the incident light.

2. The optical system of claim 1, wherein the first display is an electronic display, and the second display is a real-world object in a real-world scene.

3. The optical system of claim 2, wherein first display comprises one or more of a liquid crystal display (LCD), and an organic light emitting diode (OLED) display.

4. The optical system of claim 1, wherein the optical stack is curved.

5. The optical system of claim 1, wherein at least one of the partial reflector and the retarder layer is curved.

6. The optical system of claim 1, wherein the reflective polarizer comprises one or more of a wire grid reflective polarizer, and a multilayer polymeric reflective polarizer.

7. The optical system of claim 1, wherein the reflective polarizer makes an angle between about 30 degrees to about 60 degrees with the first display.

8. The optical system of claim 1, wherein the reflective polarizer makes an angle of about 45 degrees with the first display.

9. The optical system of claim 1, wherein for substantially normally incident light and for each of the blue, green and red wavelengths, the absorbing polarizer transmits at least 70% of the incident light having the first polarization state and absorbs at least 70% of the incident light having the second polarization state.

10. The optical system of claim 1, wherein the optical stack further comprises an adhesive layer bonding the partial reflector to the retarder layer.

11. The optical system of claim 1, wherein for substantially normally incident light and for each of the blue, green and red wavelengths:

the reflective polarizer reflects at least 80% of the incident light having the first polarization state and transmits at least 70% of the incident light having the second polarization state; and the partial reflector reflects at least 80% of the incident light for each of the first and second polarization states.

12. The optical system of claim 1, wherein for substantially normally incident light and for each of the first and second polarization states and for each of the blue-green and green-red wavelengths:

the reflective polarizer transmits at least 80% of the incident light; and the partial reflector transmits at least 70% of the incident light.

13. The optical system of claim 1, wherein the blue wavelength is in a range from about 425 nm to about 475 nm, the green wavelength is in a range from about 525 nm to about 575 nm, and the red wavelength is in a range from about 625 nm to about 700 nm.

14. The optical system of claim 1, wherein the partial reflector comprises a plurality of polymeric layers numbering greater than about 50 in total.

* * * * *